United States Patent [19]
Seachman et al.

[11] Patent Number: 4,877,310
[45] Date of Patent: Oct. 31, 1989

[54] ELECTRONICALLY VARIABLE MTF FILTER FOR IMAGE SENSOR ARRAYS

[75] Inventors: Ned J. Seachman, Penfield; Joseph P. Taillie, Rochester; Gary A. Dir, Fairport, all of N.Y.

[73] Assignee: Xerox Corporation, Stamford, Conn.

[21] Appl. No.: 228,077

[22] Filed: Aug. 4, 1988

[51] Int. Cl.[4] .......................... G02F 1/13; G02B 27/42
[52] U.S. Cl. ................................ 350/347 E; 350/335; 350/162.12
[58] Field of Search ............... 350/334, 336, 335, 340, 350/341, 347 R, 347 V, 347 E, 348, 162.12, 162.19

[56] References Cited

U.S. PATENT DOCUMENTS

| | | | |
|---|---|---|---|
| 3,694,053 | 9/1972 | Kahn | 350/150 |
| 3,700,902 | 10/1972 | Buchan | 350/162.12 |
| 3,843,231 | 10/1974 | Borel et al. | 350/348 |
| 3,980,396 | 9/1976 | Pollack et al. | 350/348 |
| 3,993,976 | 11/1976 | Ginsburg | 350/162.12 |
| 4,045,124 | 8/1977 | Pollack et al. | 350/336 |
| 4,394,069 | 7/1983 | Kaye | 350/347 E |
| 4,444,469 | 4/1984 | Kaye | 350/347 E |
| 4,522,468 | 6/1985 | Goscianski | 350/347 E X |
| 4,579,423 | 4/1986 | Fergason | 350/334 |
| 4,589,030 | 5/1986 | Kley | 350/335 |
| 4,606,612 | 8/1986 | Iizuka | 350/347 R X |
| 4,693,560 | 9/1987 | Wiley | 350/347 E |

Primary Examiner—Stanley D. Miller
Assistant Examiner—Huy Kim Mai
Attorney, Agent, or Firm—Frederick E. Mullen

[57] ABSTRACT

A liquid crystal birefringent MTF filter is permanently positioned between lens and array of an image input scanner to reduce image modulation at frequencies where moire occurs, with a source of electric potential and a control switch for selectively applying the potential and switching the filter to or from a filtering state. In a variation of the first embodiment, a two-stage MTF filter is used. In a second embodiment, a tunable liquid crystal scattering MTF filter is combined with a full width sensor array.

6 Claims, 4 Drawing Sheets

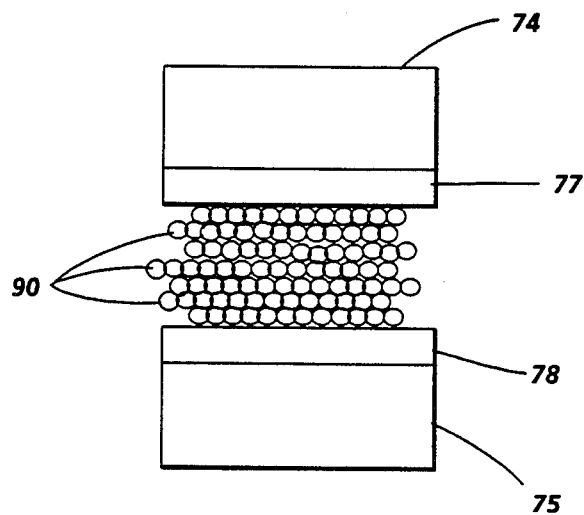
FIG. 6
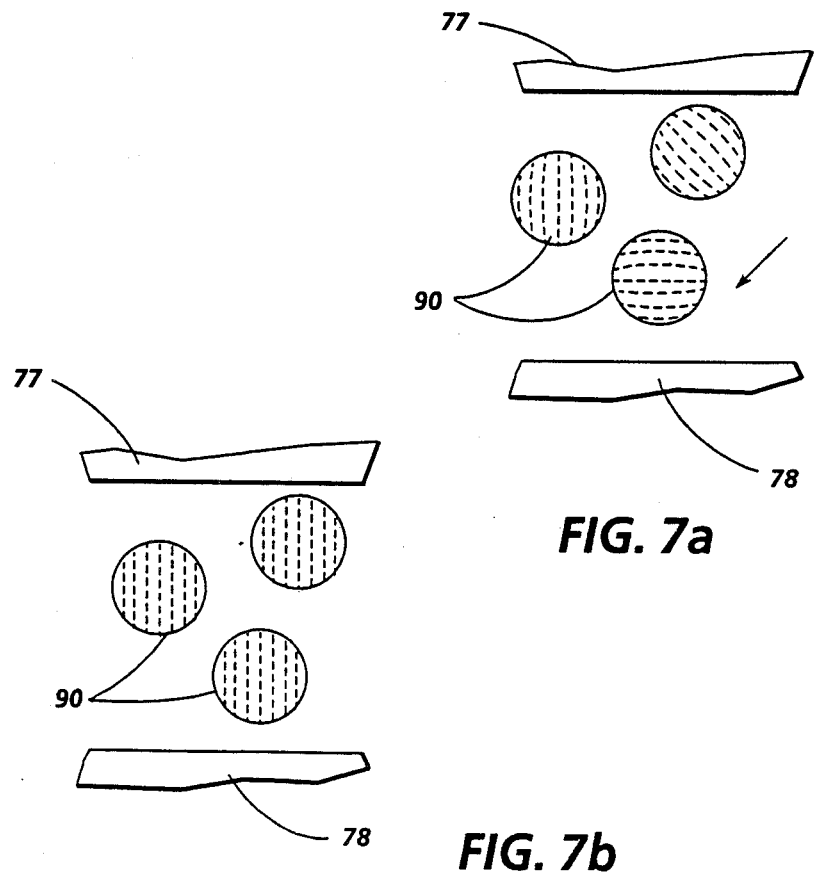
FIG. 7a
FIG. 7b

ELECTRONICALLY VARIABLE MTF FILTER FOR IMAGE SENSOR ARRAYS

The invention relates to raster input scanners, and more particularly, to an electronically variable MTF filter for image sensor arrays.

The double refraction effect of birefringent optical crystals may be used to provide a Modulation Transfer Function (MTF) filter that allows a controlled reduction in image modulation at higher spatial frequencies in image input scanners of the type having one or more sensor arrays for scanning and converting images to electrical representations or pixels. The MTF filter is normally positioned between the scanner lens and sensor array to reduce image modulation at those frequencies which would cause moire fringes when sampled at the natural sampling frequency of the scanner's sensor array or, in the case where the pixels are used to produce prints or copies, at the printer. It is common practice to fabricate filters of this type from quartz crystals in which a thin polished plate of quartz, typically one or two millimeters thick, is cut with the face of the plate at 45° to the quartz optical axis. The birefringence of the quartz crystal causes a 'ray' of light entering the plate to be split into two separate orthogonally polarized rays. Quartz crystals providing separations of 7 to 10 μm are commonly used for image input scanners, with the thickness of the quartz plate selected to reduce moire at a particular halftone cell frequency.

However, it is generally undesirable to have this type of filter present when non-halftone documents are being scanned since the filter reduces image resolution. To avoid this, it is necessary to mechanically withdraw the quartz plate from the optical path and replace it with an equivalent thickness of ordinary glass. Further, it may be desirable to have several filters for different ray separations in order to effectively cover different halftones ranging from 100 to 175 cells/inch. While this is achievable by moving one of several different quartz plates into the optical path, it is mechanically inconvenient, expensive, and generally not practiced commercially.

In the prior art, liquid crystals per se are well known as demonstrated by U.S. Pat. No. 4,579,423 to Fergason where a method for making encapsulated liquid crystals is described and shown. The use of liquid crystals as beam deflectors is demonstrated by U.S. Pat. No. 3,843,231 to Borel et al wherein a liquid crystal cell is disposed astride and oblique to the path of a beam of light, the liquid crystal cell deflecting the beam into another path in response to the application of a potential difference across the crystal's electrodes. U.S. Pat. No. 4,045,124 to Pollack et al shows a bi-stable deflection system employing nematic liquid crystalline materials for deflecting light beams, while U.S. Pat. No. 3,694,053 to Kahn discloses a nematic liquid crystal device used for color or intensity modulation. And, U.S. Pat. No. 3,980,396 to Pollack et al, discloses the use of various liquid crystal structures as modulators for light, while U.S. Pat. Nos. 4,444,469 and 4,394,069 to Kaye disclose use of zero twist liquid crystal cells as narrow band rejection or retardation filters capable of being tuned for selection of color transmittance by the application of a suitable voltage to the liquid crystal cells.

In contrast to the prior art, the present invention uses a liquid crystal in a double refraction mode to generate two simultaneous but displaced images as determined by the obliquity of the liquid crystal optic axis relative to the filter face. More particularly, the present invention provides, in a first embodiment, a raster input scanner having at least one sensor array and means providing an optical path for focusing the image being scanned on the array, a birefringent MTF filter comprised of a liquid crystal cell between a pair of glass plates having transparent electrodes stationarily disposed in the optical path, the filter being switchable, upon the application of a potential across the electrodes, from a non-filtering state to a filtering state; and control means for applying a potential to the electrodes to selectively switch the filter on and off.

Further, the present invention provides, in a second embodiment, a raster input scanner having at least one sensor array and means providing an optical path for focusing the image being scanned on the array, a scattering MTF filter comprised of a liquid crystal cell between a pair of glass plates with transparent electrodes stationarily disposed in the optical path, the filter being switchable upon the application of a potential across the electrodes from a non-filtering state to a filtering state; and control means for applying a potential to the electrodes to selectively switch the filter on and off.

IN THE DRAWINGS

FIG. 6 is an end view of a liquid crystal MTF filter illustrating the liquid crystal structure of the filter;

FIG. 7a is a schematic view depicting the liquid crystals of an MTF filter in a scattered state; and FIG. 7b is a schematic view depicting the liquid crystals of an MTF filter in an aligned state as the result of the application of a potential across the filter electrodes.

Typical scanning systems today use relatively small CCD type arrays to scan the document. Since the physical size (i.e., 1.5") of this type of array is much less than that of the typical document (i.e., 8½"-17"), reduction optics are used to focus the image line down onto the array. An MTF filter is thus required to create a small image displacement of approximately 5-15 μm which is normally sufficient for moire reduction. This is because the center-to-center distance of the sensing elements of these arrays is typically 7 μm.

Figure 1:
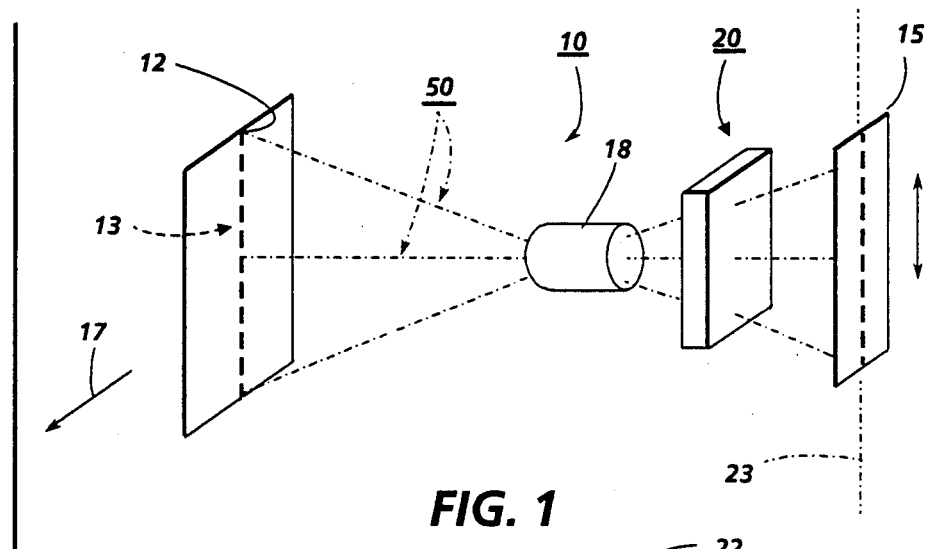
FIG. 1 is a schematic view of an image input scanner incorporating the electronically variable birefringent MTF filter of the present invention.

Referring to FIG. 1 of the drawings, there is shown a schematic representation of a scanning system 10 in which a document 12 is scanned line by line by a linear sensor array 15. Array 15 may comprise any suitable sensor array such as a Charge Coupled Device (CCD). A lens 18 focuses rays 50 from a line 13 of document 12 onto the array 15. Suitable means (not shown) are provided to establish scanning movement of document 12 relative to array 15 in the direction shown by the arrow 17.

To effect controlled reduction in image modulation at higher spatial frequencies, the electronically variable MTF filter of the present invention, designated generally by the numeral 20, is permanently positioned in the optical path between array 15 and lens 18. Filter 20 is preferably rotated so that the ray separation effected by filter 20 occurs in a direction parallel to the sensor optic axis 23, thus reducing MTF only in the 'fast scan' direction.

Figure 2:
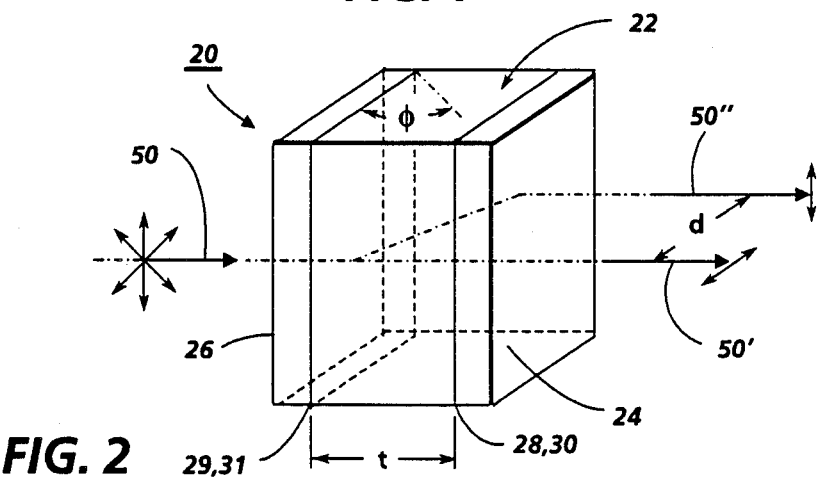
FIG. 2 is an isometric view of the MTF filter in which a light ray impinged thereon is transformed and output as ordinary and extraordinary rays by the filter.
Figure 3:
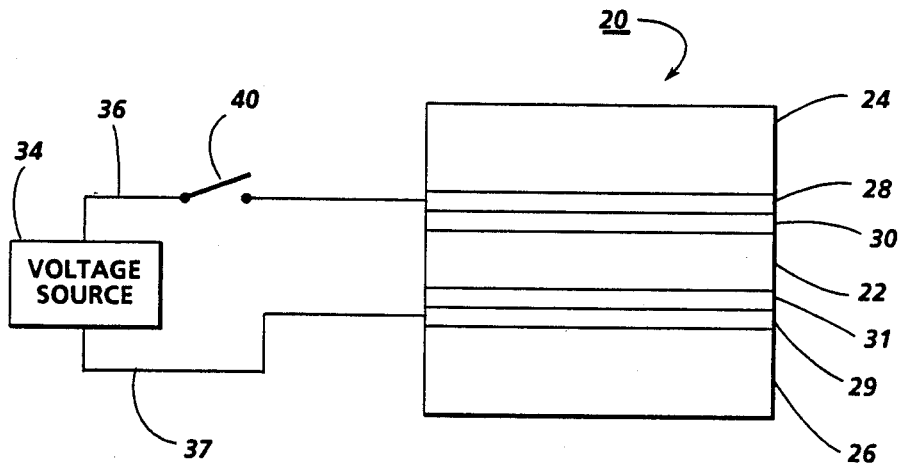
FIG. 3 is a side view in section showing details of the MTF filter construction and the control for turning the filter on and off.
Figure 5:
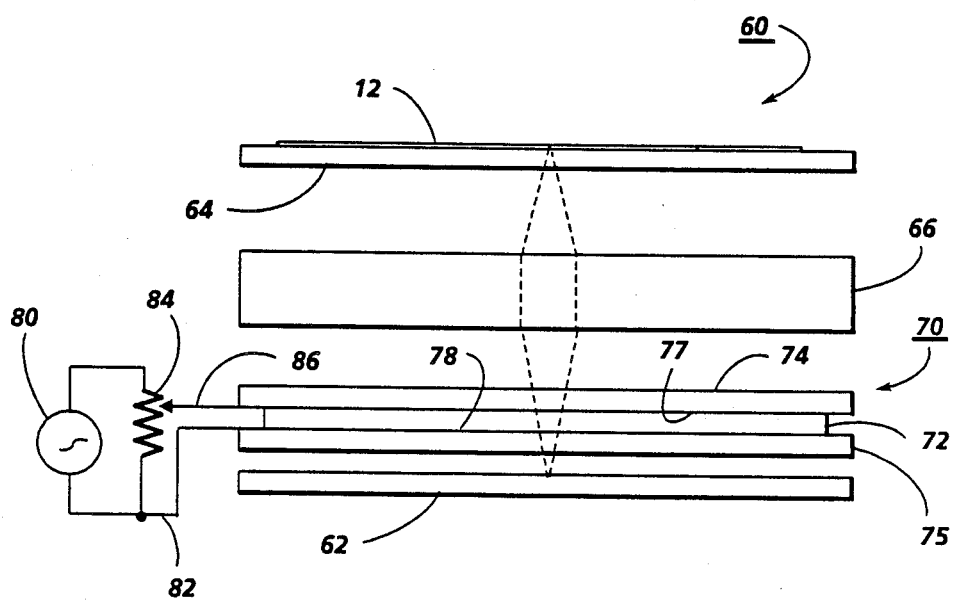
FIG. 5 is a schematic view of a second embodiment in which an image input scanner employing a full width sensor array, with full width scattering MTF filter is shown.

Referring to FIGS. 2 and 3, filter 20 comprises a properly selected uniaxial liquid crystal 22 disposed between glass plates 24, 26. Plates 24, 26 each have a transparent electrode 28, 29 respectively, with an alignment layer 30, 31 between crystal 22 and plate 24 and between crystal 22 and plate 26. A suitable voltage source 34 is provided for operating filter 20. Leads 36, 37 couple voltage source 34 to electrodes 28, 29 respectively through control switch 40, closure of switch 40 applying a predetermined voltage potential across electrodes 28, 29 to produce an electric field across crystal 22.

As will be understood, the optic axis of uniaxial liquid crystal materials such as crystal 22 can be rotated by the application of an electric field. The electric field produces a torque on the liquid crystal resulting from interaction with the liquid crystal dipole moment.

Referring particularly to FIG. 2, the initial optic axis or tilt angle $\phi$ of the liquid crystal, that is, the angle between the plane of the crystal substrate and the optic axis, is determined by the surface preparation of the glass substrates used and is typically either 0°, 35°–45°, or 90° depending on the treatment. For example, a zero (0°) degree tilt angle $\phi$ may be obtained by buffing polymers such as parylene and polyimides. A tilt angle $\phi$ in the range of 35°–45° may be introduced by oblique evaporation of silicon monoxide. And a tilt angle $\phi$ of 90° in which the molecular axis is orthogonal to the plane of the surface can be achieved by treating the surface with certain chromium or silane compounds. In FIG. 2, a tilt angle $\phi$ of 45° is shown.

Where the initial tilt angle is 0° or 90°, the electric field is adjusted such that it rotates the optic axis to a 45 degree position. If, however, a surface treatment is used which gives a 35°–45° initial tilt angle, the electric field is used to drive the optic axis either parallel to or orthogonal to the plane of the substrate depending on the type of liquid crystal used. The latter approach is preferred since it is expected to provide a more consistent switching.

In operation of the FIGS. 1–3 embodiment, an electric potential is applied across electrodes 28, 29 by voltage source 34 on closure of switch 40 to change the direction of the crystal's optic axis. By switching voltage source 34 on or off, the optic axis may be switched from a direction normal to the plane of the substrate, resulting in a single output ray 50' for all polarizations, to a direction which is approximately 45 degrees to the plane of the substrate resulting in a separation of the input ray 50 into plural rays 50' and 50".

In this latter mode, with the ray separation having a value d, filter 20 imposes an additional modulation transfer function s(f) on the scanning system in accordance with the following relationship:

$$s(f) = \cos(\pi f d) \qquad (1)$$

f is the spatial frequency and the value of d is selected so that the first zero of s(f) occurs approximately at the desired spatial frequency which is to be eliminated or reduced.

The maximum ratio of extraordinary-to-ordinary refractive index ($n_e/n_o$) for currently available liquid crystals is about 1.2. With a liquid crystal cell thickness t of approximately 60 μm, the ray separation d is given by:

$$d = \tfrac{1}{2}(n_e/n_o - n_o/n_e)t \qquad (2)$$

$$d = \tfrac{1}{2}(1.2 - 1/1.2)60$$

$$d = 11 \ \mu m$$

From equation 1, it can be seen that the first zero of s(f) occurs at f=45.45 cycles/mm in image space corresponding to an object space frequency, for a 9.07X reduction optical system for example, of 5.0 cycles/mm or 127 cycles/in. This frequency corresponds to the x-direction fundamental frequency of a 45° rotated halftone screen of about 180 cells/inch.

The filtering effect of the liquid crystal 22 may be switched on and off without physically removing the filter from the optical path. When crystal 22 is switched to a 45° optic axis condition, two rays 50', 50" are produced for each incident ray 50 and the MTF function of equation 11 is imposed on the scanning system, reducing moiré in the higher frequency (i.e., approximately 150 cells/inch and higher) halftone input documents. Alternately, switching the crystal optic axis normal or parallel to the filter face by opening switch 40 returns the filter 20 to the single output ray state in which no MTF reduction occurs maximizing MTF where filtering is not required.

Figure 4A:
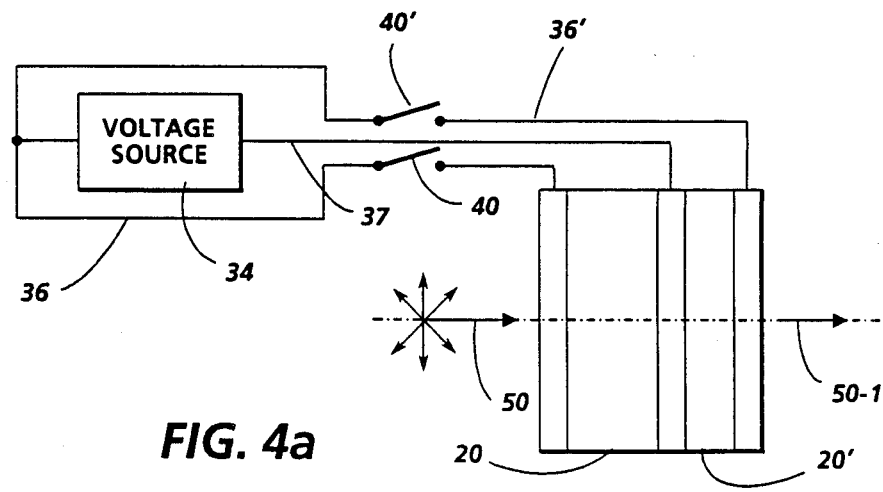
FIG. 4a is a top view of a variation of the birefringent MTF filter shown in FIG. 2 with two successive filtering stages in which neither filtering stage is activated.
Figure 4B:
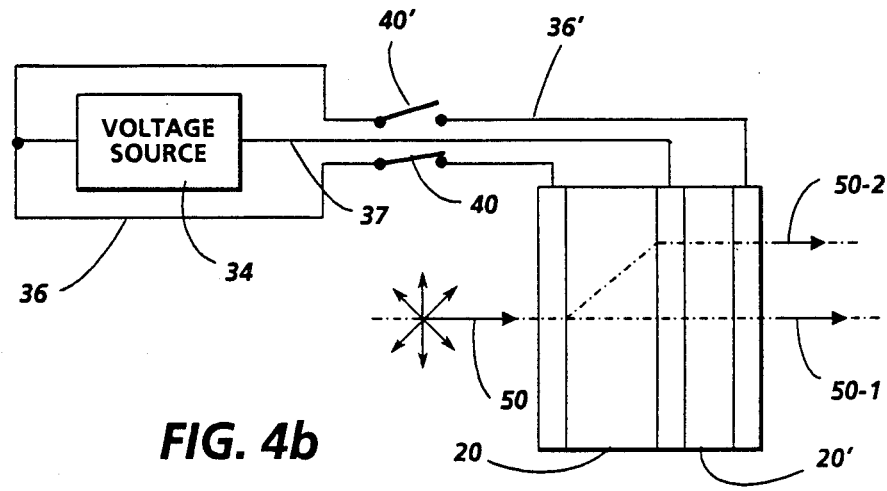
FIG. 4b is a view of the filter shown in FIG. 4a in which the first filtering stage only is activated.
Figure 4C:
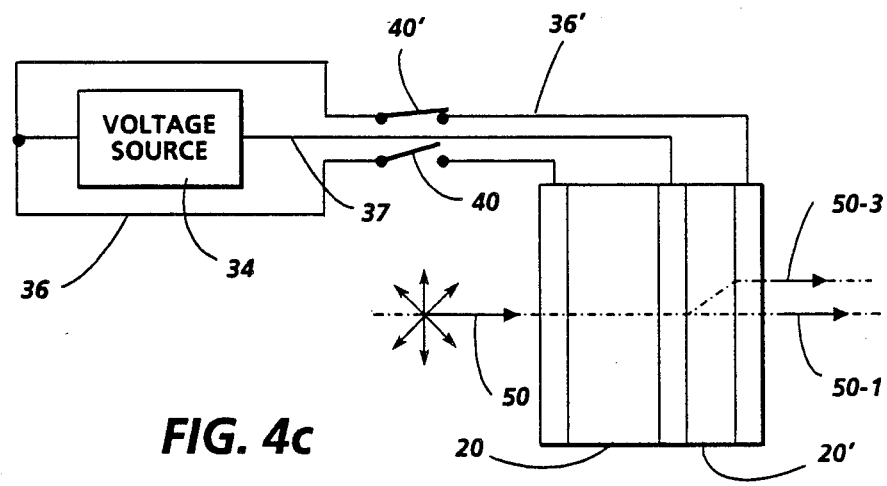
FIG. 4c is a view of the filter shown in FIG. 4a in which the second filtering stage only is activated.

Referring now to the variation shown in FIG. 4, where like numbers refer to like parts, a dual stage filter is there shown in which the single stage liquid crystal filter 20 is extended to lower halftone frequencies by adding a second filter stage 20', each filter stage 20, 20' operating in the manner described above. For example, where it is desired to also filter halftone screens in the lower frequency range of 125 to 150 cells/inch, a second filter stage 20' which produces an additional ray displacement of 3.90 μm is added. In this arrangement, a second control switch 40' is provided for selectively coupling filter stage 20' to voltage source 34 when it is desired to switch filter stage 20' to a filtering state.

Where as shown in FIG. 4a, both control switches 40, 40' are open, both filter stages 20, 20' are switched to zero ray deviation and a single ray 50-1 is produced for each incident ray 50. As a result, there is a negligible MTF effect on the system as is for example desired for "non-halftone" modes of document scanning. Where as shown in FIG. 4b, only control switch 40 is closed, the first filter stage 20 activated and two rays 50-1 and 50-2 are produced for each incident ray 50. As a result, the higher range of halftone cell frequencies from 150 to 175 (and above) cells/inch are effectively reduced. Where as shown in FIG. 4c, control switch 40' is closed, only the second filter stage 20' is activated. This results in two rays 50-1 and 50-3 for each incident ray with a 3.9 μm ray displacement.

Figure 4D:
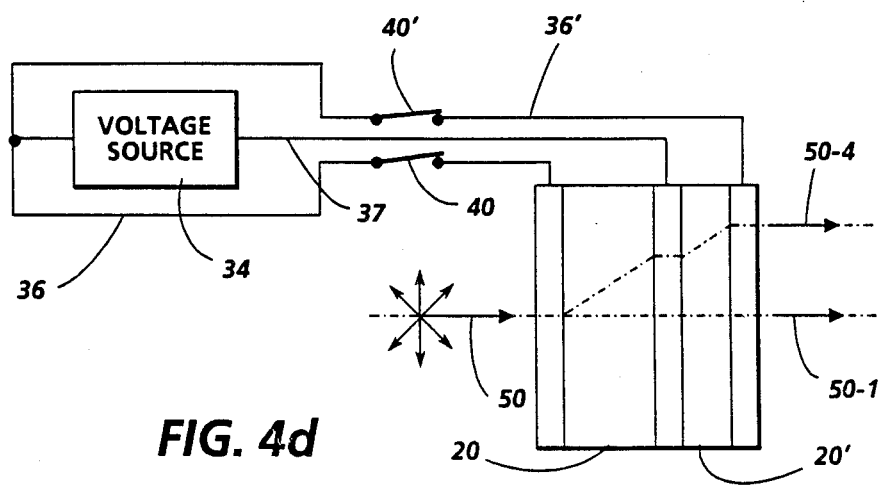
FIG. 4d is a view of the filter shown in FIG. 4a in which both first and second filtering stages are activated.

Where, as shown in FIG. 4d, control switches 40, 40' are closed, the two filter stages 20, 20' are switched to a filtering state, resulting in two rays 50-1 and 50-4 for each incident ray. The total extraordinary ray displacement is then 11.0+3.9=14.9 μm, which according to equation 1 produces a 0 for s(f) at f=33.6 cycles/mm. Presuming a 9.07X optical reduction, this corresponds to 3.7 cycles/mm or 94.0 cycles/inch in the object plane. For a 45° rotated halftone screen, this corresponds to a screen frequency of 94.0/.707=133 cells/inch. Thus, with both filter stages 20, 20' operative, a total deviation of 14.9 μm between the rays 50-1 and 50-4 is produced, reducing the moire for a common range of halftone frequencies from 125 to 150.

It is understood that other relative rotations of the optic axes between cells are possible and would create more than two exiting rays.

Referring now to the embodiment shown in FIGS. 5-8, where like numbers refer to like parts, a raster input scanner 60 is there shown of the type employing a full width sensor array 62 to scan a document 12 supported on a transparent platen 64 line by line. Array 62 is termed a full width sensor array since array 62 has an effective scanning length equal to or slightly greater than the width of platen 64. To focus array 62 onto the document line, a gradient index lens array 66 (typically operating near 1×magnification) coextensive with array 62 is positioned between array 62 and platen 64. Array 62 together with lens array 66 are suitably supported on a movable carriage (not shown) for scanning movement relative to plate 62 and the document 12 thereon during scanning.

Neither the prior art solid crystal birefringent technology nor the birefringent liquid crystal technology described heretofore are conveniently or economically applicable to a full-width sensor array such as array 62 where the sensor-to-sensor center spacing is typically 63.5 μm and the overall length is 12 to 17 inches. While sufficiently large double refraction can be achieved using crystals having high extraordinary-to-ordinary refractive index ratios such as calcite, potassium dihydrogen phosphate (KDP), ammonium dihydrogen phosphate (ADP), lithium niobate and the like, achieving the long lengths that are necessary to accommodate a full width sensor array such as array 62 requires assembling many carefully cut and polished pieces of moderately expensive crystals. The resultant cost and complexity of assembly is undesirable. Further, the use of double refraction in solid optical crystals of the type described above requires that the crystal be cut so as to provide filtering over one specified band of frequencies. Thus, crystals of these types are not adjustable for a variety of frequency bands. Further, use of previously described liquid crystal technique requires excessively large thicknesses and/or many stages.

To avoid the need for expensive and complex solid optical crystals of the type described above and permit adjustment and tuning for different frequency bands, an elongated electronically tunable MTF filter 70 whose length is substantially equal to or slightly longer than the length of array 62 is provided between full width sensor array 62 and lens array 66. Filter 70 comprises an elongated liquid crystal 72 which can be operated in a scattering mode disposed between clear top and bottom glass plates 74, 75 respectively. Electrodes 77, 78 are formed on the surfaces of glass plates 74, 75 adjacent to the surfaces of crystal 72. To operate and permit tuning of filter 70, a suitable alternating current (a.c.) source 80 is provided, one terminal of a.c. source 80 being coupled to electrode 78 through lead 82. The opposite terminal of a.c. source 80 is coupled through an adjustable resistor 84 and lead 86 to electrode 77 of filter 70.

Crystal 72 comprises a material which can change from a transparent state to a scattering state by controlling the voltage applied across the liquid crystal film. When placed in proximity to the full width sensor array 62, filter 70 permits the optical system's point spread function to be selectively varied by adjusting resistor 84. As a result, filter 70 behaves as an optical "low-pass" frequency domain filter for which the pass bandwidth may be continually varied by adjusting the voltage input thereto.

Several techniques exist for enabling a controllable clear-to-diffuse scattering transition in liquid crystals. In one, referred to as Nematic Curvilinear Aligned Phase (NCAP), nematic liquid crystal droplets 90 are encapsulated in a polymer between electrodes 77, 78 as shown in FIGS. 6 and 7. When no voltage is applied to electrodes 77, 78, the crystals 90 are aligned as shown in FIG. 7a. Since in this state, index of refraction discontinuities exist, diffuse light scattering takes place. When an electric field is applied as shown in FIG. 7b, the crystals align reducing the index of refraction discontinuity within the polymer and the filter becomes clear.

The degree of scattering is controlled by the amplitude of the voltage applied from a.c. source 80. It is also a function of the liquid crystal droplet density, layer thickness, and the index of refraction of the liquid crystal relative to that of the polymer. Filter 70 is normally located within several millimeters of full width sensor array 62. Application of a potential of approximately 50 volts (60 Hz ac) is expected to clear filter 70 with reductions in voltage causing a gradual increase in scattering, thus reducing the high frequency modulation of the image incident on the full with sensor array.

Other possible filter materials include cholesterics where phase and texture transitions may be applied and smectics which demonstrate scattering-to-clear transitions.

While the invention has been described with reference to the structure disclosed, it is not confined to the details set forth, but is intended to cover such modifications or changes as may come within the scope of the following claims.

We claim:

1. An image input scanner having at least one sensor array for scanning and converting images to electrical signals, and means providing an optical path for focusing image rays to the image being scanned on the array, the combination of:
   (a) a birefringent MTF filter stationarily disposed in said optical path for filtering said image rays, said filter including
   (1) a pair of transparent plates,
   (2) a liquid crystal cell between said plates, and
   (3) a transparent electrode between each of said plates and said liquid crystal cell,
   (b) a source of electrical potential adapted when coupled to said electrodes to switch said filter from a non-filtering state to a filtering state; and (c) control means for selectively coupling said electrodes to said source of electrical potential to filter said image rays.

2. The scanner according to claim 1 in which said filter has at least two successive independently switchable filter stages to provide compound filtering on switching of both said filter stages to a filtering state.

3. In an image input scanner having at least one linear sensor array for scanning and converting images to electrical signals and a lens for focusing image rays to the image being scanned on the array, the combination of:
   (a) an MTF filter stationarily disposed between said lens and said array so that image rays impinging on said filter pass through said filter, said filter being adapted when switched to separate each of the image rays impinging on said array into at least two image rays offset from one another along an axis parallel to the linear axis of said array whereby to spread said image rays and reduce moire;
   (b) a source of electrical potential for switching said filter to a filtering state; and
   (c) control means for selectively coupling said source of electrical potential to said filter when filtering of said image rays is desired.

4. In an image input scanner having at least one sensor array for scanning and converting images to electrical signals, and means providing an optical path for focusing image rays to the image being scanned on the array, the combination of:
   (a) a scattering MTF filter stationarily disposed in said optical path for filtering said image rays, said filter including
   (1) a pair of transparent plates,
   (2) a liquid crystal cell between said plates, and
   (3) a transparent electrode between each of said plates and said liquid crystal cell,
   (b) a source of electrical potential adapted when coupled to said electrodes to switch said filter from a non-filtering state to a filtering state; and
   (c) control means for selectively coupling said electrodes to said source of electrical potential to filter said image rays.

5. In an image input scanner having a full width sensor array with relatively large center-to-center distances between the sensors that comprise said array, and a lens array for focusing image rays from the image being scanner on the array sensors, a system for reducing moire comprising:
   (a) an electrically tunable MTF filter, said filter having a length at least equal to the length of said array and being positioned between said array and fiber optic lens array;
   (b) said filter changing from a transparent state to a scattering state in response to the application of a voltage to said filter; and
   (c) control means for applying a potential to said filter to switch said filter to said scattering state to provide a controlled degree of filtering of said light rays to impingement of said light rays on said array sensors whereby moire is reduced.

6. In an image input scanner having at least one sensor array and a lens for focusing the image being scanned on the array, an MTF filter comprised of a pair of glass plates, a liquid crystal cell between said plates, and a transparent electrode between each of said plates and said liquid crystal,
   said filter being non-removably positioned between said lens and said array,
   said filter being switchable upon the application of a preset potential to said array from a non-filtering state to a filtering state in which said light rays output by said filter are scattered and multiplied; and
   control means for selectively switching said filter from said non-filtering state in which light rays pass through said filter substantially unimpeded to said filtering state in which said light rays are filtered whereby to reduce moiré.

* * * * *